(12) United States Patent
Stein et al.

(10) Patent No.: US 8,641,372 B2
(45) Date of Patent: Feb. 4, 2014

(54) CHARGING DEVICE

(75) Inventors: Matthias Stein, Korntal-Münchingen (DE); Dirk Blümmel, Schwieberdingen (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 1051 days.

(21) Appl. No.: 12/690,541

(22) Filed: Jan. 20, 2010

(65) Prior Publication Data

US 2010/0209232 A1    Aug. 19, 2010

(30) Foreign Application Priority Data

Jan. 23, 2009  (DE) .......................... 10 2009 005 938

(51) Int. Cl.
*F04D 29/56* (2006.01)

(52) U.S. Cl.
USPC ........................... 415/160; 415/165; 415/186

(58) Field of Classification Search
USPC ......... 415/177, 178, 180, 159, 160, 163, 164, 415/165, 183, 184, 186, 196, 200, 208.2, 415/229; 417/423.12; 384/905, 278
See application file for complete search history.

(56) References Cited

U.S. PATENT DOCUMENTS

| | | | |
|---|---|---|---|
| 4,794,758 A | 1/1989 | Nakazawa et al. | |
| 6,558,117 B1 | 5/2003 | Fukaya et al. | |
| 2003/0123977 A1 | 7/2003 | Bertnik et al. | |
| 2004/0231327 A1 * | 11/2004 | Ohishi | ........................... 60/602 |
| 2006/0179838 A1 | 8/2006 | Nakagawa et al. | |
| 2008/0138196 A1 | 6/2008 | Meier et al. | |

FOREIGN PATENT DOCUMENTS

| | | |
|---|---|---|
| DE | 232524 | 1/1986 |
| DE | 268028 | 5/1989 |
| DE | 10256418 A1 | 6/2004 |
| DE | 60035757 T2 | 4/2008 |
| DE | 102007048274 A1 | 4/2008 |
| EP | 0238038 A2 | 9/1987 |
| EP | 1698773 A1 | 9/2006 |
| WO | WO-2005/106213 A1 | 11/2005 |

OTHER PUBLICATIONS

English abstract for DE-102007048274.
Germany Search Report.

* cited by examiner

*Primary Examiner* — Edward Look
*Assistant Examiner* — Maxime Adjagbe
(74) *Attorney, Agent, or Firm* — Rader, Fishman & Grauer PLLC

(57) ABSTRACT

The invention relates to a charging device (1), more preferably an exhaust gas turbocharger for a motor vehicle, which turbine geometry comprises guide blades (5) rotatably mounted in a blade bearing ring (4), wherein the blade bearing ring (4) with a side is directly exposed to a hot gas flow (12) while the side of the blade bearing ring (4) facing away from this is only indirectly exposed to the hot gas flow (12). It is substantial to the invention that the blade bearing ring (4) on its side directly exposed to the hot gas flow (12) is produced of a different material than on its side only indirectly exposed to the hot gas flow (12) wherein the two materials with regard to their heat expansion coefficients are selected in such a manner that the blade bearing ring (4) at preferentially all occurring operating temperatures expands evenly without warping.

19 Claims, 2 Drawing Sheets

CHARGING DEVICE

CROSS-REFERENCES TO RELATED APPLICATIONS

This application claims priority to German patent application DE 10 2009 005 938.5 filed on Jan. 23, 2009, which is hereby incorporated by reference in its entirety.

TECHNICAL FIELD

The present invention relates to a charging device, more preferably an exhaust gas turbocharger for a motor vehicle according to the preamble of claim 1. The invention additionally relates to a combustion engine equipped with such a charging device and a motor vehicle equipped with such a combustion engine.

BACKGROUND

In modern motor vehicles, exhaust gas turbochargers with so-called variable turbine geometries are increasingly employed, wherein the power output and the response characteristics can be adapted to various operating conditions (for example load change). To achieve this, adjustable non-rotating guide blades are located in the turbine inlet or in the turbine housing, which blades are usually mounted together in a blade bearing ring. Through different operating temperatures at a front side exposed to the hot gas flow and a back side of the blade bearing ring facing away from said front side, uneven heat expansion of the latter can occur, as a result of which it can get warped for example and as a result threaten smooth-running mounting of the guide blades in the blade bearing ring.

From DE 103 37495 A1 a generic exhaust gas turbocharger for a combustion engine is known wherein at least one threaded pin is provided which fastens a blade bearing ring carrying individual guide blades to a bearing housing of the exhaust gas turbocharger on a side facing away from the flow channel. The aim of this is to achieve simplified assembly on the one hand and the omission of parts in the flow channel interfering with the flow.

From DE 10 2004 062564 A1 a blade bearing ring of a charging device is known, which in terms of material is designed for high engine outputs. To this end, the blade bearing ring is characterized by a component of 1-6% by weight of an alloy element or a plurality of these elements such as tungsten, cobalt, niobium, rhenium, molybdenum, tantalum, vanadium, hafnium, yttrium, zirconium or the like. The aim here is to achieve more preferably a high creep resistance and high strength at temperatures above 850° C.

SUMMARY

The present invention deals with the problem of stating an improved embodiment for a charging device of the generic type, wherein more preferably high functional safety independent of the occurring operating temperatures is provided.

According to the invention, this problem is solved through the subjects of the independent claims. Advantageous embodiments are the subject of the dependent claims.

The invention is based on the general idea of adapting a blade bearing ring of a variable turbine geometry in a charging device in terms of its heat expansion to the operating temperatures which occur on the opposing axial face ends of the blade bearing ring. Here, the blade bearing ring usually accommodates the guide blades rotatably mounted therein and with one side is directly exposed to a hot gas flow, while the face end of the blade bearing ring facing away therefrom, is only indirectly exposed to the hot gas flow. According to the invention, the blade bearing ring on its side directly exposed to the hot gas flow is produced from a different material, more preferably having a different heat expansion coefficient than on its side only indirectly exposed to the hot gas flow. Here, the heat expansion coefficient on the side exposed to the hot gas flow is preferentially significantly smaller than on the opposite side, so that the heat expansion on the side exposed to the hot gas flow because of the higher temperature of prevailing there, corresponds to the heat expansion on the opposite side of the blade bearing ring, so that the latter expands evenly and does not warp. Here, even expansion has almost no or only extremely minor effects on a bearing function of the blade bearing ring, while warpage of the blade bearing ring usually has a negative effect on the bearing function. By using at least two different materials with different heat expansion coefficients the heat expansions on the two opposing face ends of the blade bearing ring can be adapted to the respective operating temperatures prevailing there, as a result of which not only warpage of the blade bearing ring can be reliably avoided, but temperature-induced stresses within the blade bearing ring can also be reduced. Indirectly this means also a longer lifespan of the blade bearing ring and thus of the entire variable turbine geometry. By avoiding the warpage of the blade bearing ring a gap between the guide blades and a cover disc covering the latter can also be reduced, as a result of which thermodynamic efficiency of the exhaust gas turbocharger or the charging device can be improved. At the same time, the blade bearing ring according to the invention constitutes a cost-effective solution for achieving the positive effect that no additional components have to be assembled.

With an advantageous embodiment of the solution according to the invention the blade bearing ring is produced of at least two discs with different materials which have different heat expansion coefficients. The two discs of the blade bearing ring in this case are more preferably joined together by means of a metal injection moulding method. With the metal injection moulding method it is possible to produce complicated shaped parts of metal ready for installation with maximum reproducibility and varied material properties in series. Such metal injection moulding methods more preferably allow cost-effective manufacture of the support rings according to the invention in large series, wherein the metal injection moulding method additionally has the great advantage that components with excellent dimensional accuracy and small tolerances can be manufactured.

Additional important features and advantages of the invention are obtained from the subclaims, from the drawings and from the corresponding figure description by means of the drawings.

It is to be understood, that the features mentioned above and still to be explained in the following cannot only be used in the respective combination stated, but also in other combinations or by themselves, without leaving the scope of the present invention.

BRIEF DESCRIPTION OF THE DRAWING

Preferred exemplary embodiments of the invention are shown in the drawings and are explained in more detail in the following description, wherein same reference characters relate to same or similar or functionally same components.

It shows, in each case schematically

DETAILED DESCRIPTION

Figure 1:
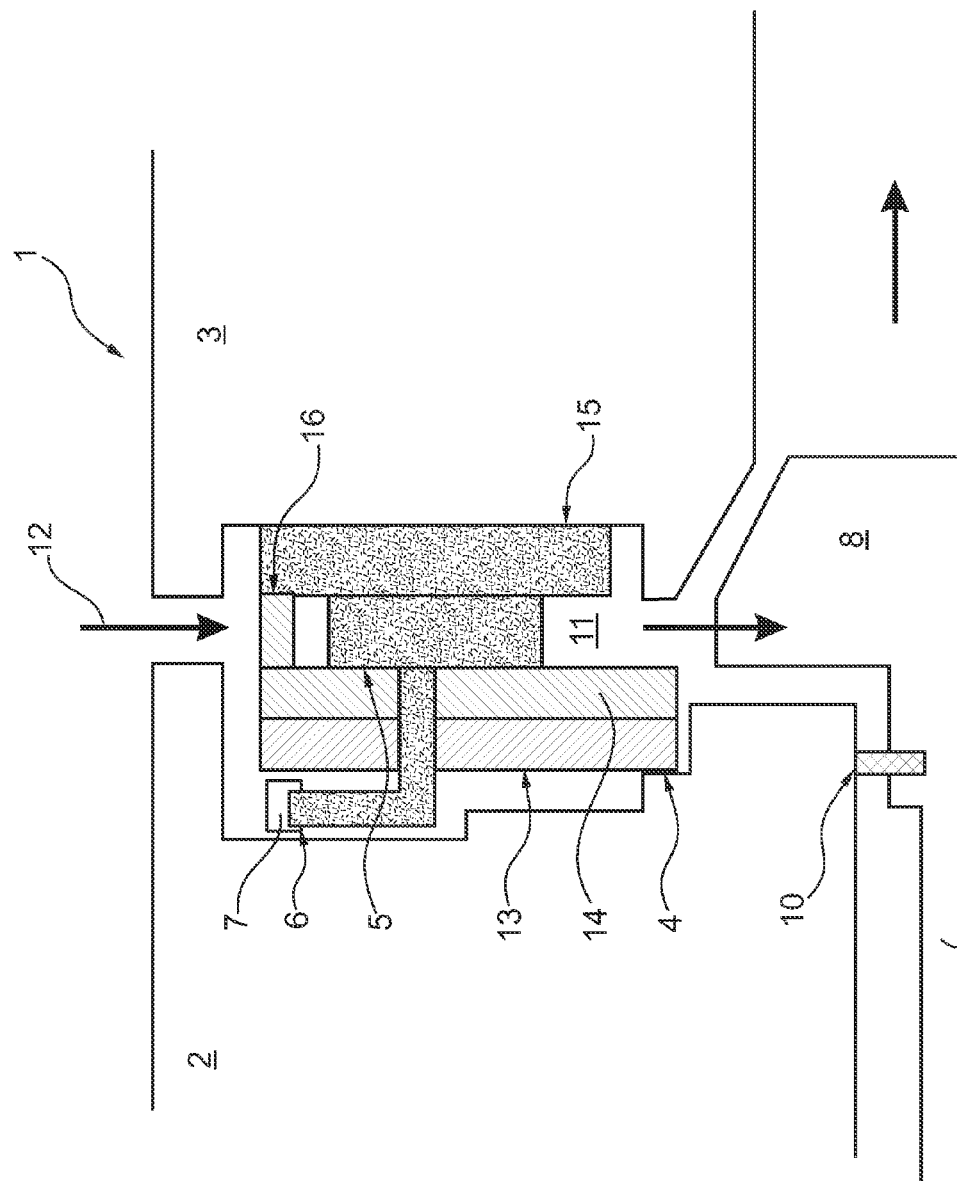
FIG. 1 a longitudinal section through a charging device according to the invention, FIG. 2 a representation as in FIG. 1, however with another embodiment.
Figure 2:
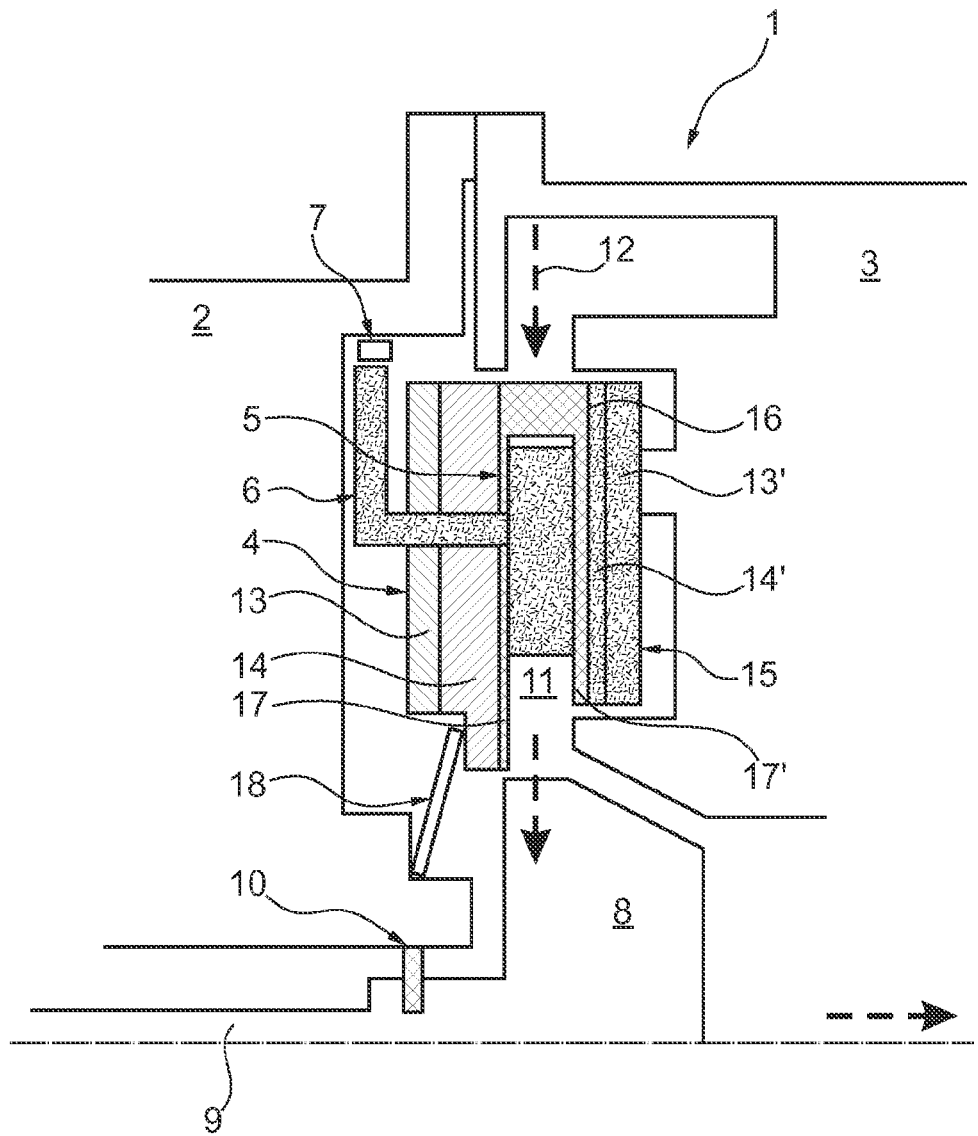

According to FIGS. 1 and 2, a charging device 1 according to the invention comprises a bearing housing 2 as well as a turbine housing 3 connected with the latter. Between the bearing housing 2 and the turbine housing 3 a variable turbine geometry is arranged, which substantially consists of a blade bearing ring 4, individual guide blades 5, adjusting levers 6 connected with the guide blades 5 in a rotationally fixed manner as well as an adjusting ring 7 for adjusting the guide blades 5.

In the bearing housing 2, a shaft 9 carrying a turbine wheel 8 and a compressor wheel which is not shown, is mounted, wherein in the region of the turbine wheel 8 and/or of the shaft 9 a sealing element 10 is optionally provided, which is to at least make passage of blow-by gases more difficult.

Here, the guide blades 5 are directly arranged in a hot gas channel 11 and thus directly exposed to a hot gas flow 12. Likewise directly exposed to the hot gas flow 12 is a side of the blade bearing ring 4 facing the hot gas channel 11, while the side of the blade bearing ring 4 facing away from said hot gas channel is not directly exposed to the hot gas flow 12 and therefore merely has to withstand lesser temperatures.

In order to be able to guarantee preferably smooth-running mounting of the guide blades 5 in the blade bearing ring 4 and thus high functional safety of the variable turbine geometry, warpage of the blade bearing ring 4 with concomitant jamming of the guide blades 5 has to be absolutely avoided. However, because of the different temperatures that occur on the different sides of the blade bearing ring 4 this has been almost impossible to date. This is where the invention comes in, wherein the blade bearing ring 4 on its side directly exposed to the hot gas flow 12 is manufactured of a different material than on its side only indirectly exposed to the hot gas flow 12. Here, both materials are selected with respect to their heat expansion coefficients in such a manner that the blade bearing ring 4 with preferentially all occurring operating temperatures expands evenly and is no longer warped. To this end, the blade bearing ring 4 can for example be produced of two discs 13 and 14 with different materials, wherein these two materials used have different heat expansion coefficients according to the invention. Since the temperature acting on the disc 14 during the operation of the charging device 1 is higher than the temperature acting on the disc 13, the material used for the disc 14 preferentially has a lower heat expansion coefficient than the material used for the disc 13. A connection between the two discs 13, 14 of the blade bearing ring 4 can for example be effected by way of casting or by means of a metal injection moulding method. It is also conceivable that a blade bearing ring 4 produced in this manner is subsequently sintered and made particularly resistant as a result.

Looking at FIG. 1 it is evident that the hot gas channel 11 in the region of the guide blades 5 is limited on the one hand by the blade bearing ring 4 and on the other hand by a cover disc 15 covering the guide blades 5, which for example is directly fastened to the turbine housing 3 or indirectly via spacing elements 16 to the blade bearing ring 4. Through the now merely even expansion of the blade bearing ring 4 a gap between the cover disc 15 and the guide blades 5 can be kept particularly small as a result of which the efficiency of the charging device 1 according to the invention is improved, since an undesirable bypass flow can now be reduced. A gap between the guide blades 5 and the blade bearing ring 4 can likewise be minimized, which also contributes towards increasing the efficiency of the charging device 1.

According to FIG. 2 the side of the blade bearing ring 4 directly exposed to the hot gas flow 12 or the disc 14 comprises a temperature protection coating 17, which can more preferably be embodied austenitically or at least comprises austenite. Here, the temperature protection coating is very thin compared with the disc 14. The disc 14 and the temperature protection coating 17 are preferentially connected with each other in a materially connecting manner. It is generally also conceivable that the blade bearing ring 4 is produced of three discs 13, 14, 17 with different materials, wherein the materials used have different heat expansion coefficients. In this case the temperature protection coating 17 could form the third disc, wherein it is obviously also conceivable that the third disc directly exposed to the hot gas flow 12 likewise comprises a further temperature protection coating which is not designated in more detail here. For shielding the side of the blade bearing ring 4 not directly exposed to the hot gas flow 12 a heat shield 18 for example in the form of a disc spring can be additionally provided.

In order to be able to make the cover disc 15 also more resistant to a temperature loading it can for example also be constructed of at least two discs 13', 14' and on the side exposed to the hot gas flow 12 comprise a temperature protection coating 17'. As a result, warpage of the cover disc 15 due to the occurring temperatures is to be reduced and thus the functional safety increased. Here, the respective discs 13, 13', 14, 14' and temperature protection layers 17, 17' are preferentially connected with one another in a materially connected manner more preferably baked together, cast together or pressed together.

With the blade bearing ring 4 according to the invention, which is produced of at least two materials with different expansion coefficients said blade bearing ring, because of the different temperatures acting on said bearing race, expands evenly on both sides so that warpage of the blade bearing ring 4 and thus a functional impairment of the variable turbine geometry can be reliably avoided. In addition to this, a blade bearing ring 4 embodied in this manner can be produced extremely cost-effectively and more preferably be installed without additional assembly expenditure so that the decisive advantage that can be achieved with it can be achieved almost without any offsetting disadvantages.

Generally, the multi-layer construction of the blade bearing ring 4 and/or the cover disc 15 can also be transferred to other components such as for example webs, spacing elements 16, cartridges, guide blade cages, cages, etc.

The invention claimed is:

1. A charging device comprising:
   a variable turbine geometry located between a bearing housing and a turbine housing, wherein said variable turbine geometry includes at least one guide blade rotatably mounted in a blade bearing ring, wherein at least one side of the blade bearing ring is directly exposed to a hot gas flow, while an opposing side of the blade bearing ring faces away from said hot gas flow and is indirectly exposed to the hot gas flow such that the blade bearing ring side directly exposed to the hot gas flow is produced of a first material and the opposing side that is indirectly exposed to the hot gas flow is produced of a second material, wherein the two materials having heat expansion coefficients are selected such that the blade bearing ring such that the blade bearing at operating temperatures expands evenly without warping; and wherein the blade bearing ring is configured from at least two discs with different materials, wherein the materials used have different heat expansion coefficients.

2. A charging device comprising:
a variable turbine geometry located between a bearing housing and a turbine housing, wherein said variable turbine geometry includes at least one guide blade rotatably mounted in a blade bearing ring, wherein at least one side of the blade bearing ring is directly exposed to a hot gas flow, while an opposing side of the blade bearing ring faces away from said hot gas flow and is indirectly exposed to the hot gas flow-such that the blade bearing ring side directly exposed to the hot gas flow is produced of a first material and the opposing side that is indirectly exposed to the hot gas flow is produced of a second material, wherein the two materials having heat expansion coefficients are selected such that the blade bearing ring-operating temperatures expands evenly without warping; and wherein the material of the blade bearing ring directly exposed to the hot gas flow has a lower heat expansion coefficient than the material exposed only indirectly to the hot gas flow.

3. The charging device according to claim 1, wherein the at least two discs of the blade bearing ring are cast together in a fixed manner.

4. The charging device according to claim 1, wherein the at least two discs of the blade bearing ring are connected with each other by a metal injection moulding method (MIM).

5. The charging device according to claim 1, wherein the at least two discs of the blade bearing ring are connected with each other by a sintering method.

6. A charging device comprising:
a variable turbine geometry located between a bearing housing and a turbine housing, wherein said variable turbine geometry includes at least one guide blade rotatably mounted in a blade bearing ring, wherein at least one side of the blade bearing ring is directly exposed to a hot gas flow, while an opposing side of the blade bearing ring faces away from said hot gas flow and is indirectly exposed to the hot gas flow-such that the blade bearing ring side directly exposed to the hot gas flow is produced of a first material and the opposing side that is indirectly exposed to the hot gas flow is produced of a second material, wherein the two materials having heat expansion coefficients are selected such that the blade bearing ring-operating temperatures expands evenly without warping; and wherein at least one of the side of the blade bearing ring directly exposed to the hot gas flow and at least one disc has a temperature protection coating.

7. The charging device according to claim 6, wherein the temperature protection coating comprises at least austenite.

8. The charging device according to claim 6, wherein the disc and the temperature protection coating are materially connected with each other.

9. The charging device according to claim 1, wherein the blade bearing ring is produced of at least three discs with different materials, wherein the materials used have different heat expansion coefficients.

10. The charging device according to claim 1, wherein the material of the blade bearing ring directly exposed to the hot gas flow has a lower heat expansion coefficient than the material exposed only indirectly to the hot gas flow.

11. The charging device according to claim 2, wherein the at least two discs of the blade bearing ring are cast together in a fixed manner.

12. The charging device according to claim 2, wherein the at least two discs of the blade bearing ring are connected with each other by a metal injection moulding method (MIM).

13. The charging device according to claim 2, wherein the at least two discs of the blade bearing ring are connected with each other by a sintering method.

14. The charging device according to claim 1, wherein at least one of the side of the blade bearing ring directly exposed to the hot gas flow and at least one disc has a temperature protection coating.

15. The charging device according to claim 2, wherein at least one of the side of the blade bearing ring directly exposed to the hot gas flow and at least one disc has a temperature protection coating.

16. The charging device according to claim 7 wherein the disc and the temperature protection coating are materially connected with each other.

17. The charging device according to claim 1, wherein the blade bearing ring is produced of at least three discs with different materials, wherein the materials used have different heat expansion coefficients.

18. The charging device according to claim 2, wherein the blade bearing ring is produced of at least three discs with different materials, wherein the materials used have different heat expansion coefficients.

19. The charging device according to claim 3, wherein the blade bearing ring is produced of at least three discs with different materials, wherein the materials used have different heat expansion coefficients.

\* \* \* \* \*